United States Patent [19]

Klein

[11] 4,194,231

[45] Mar. 18, 1980

[54] DUAL VOLTAGE GROUND FAULT PROTECTOR

[75] Inventor: Keith W. Klein, Simsbury, Conn.

[73] Assignee: General Electric Company, New York, N.Y.

[21] Appl. No.: 884,501

[22] Filed: Mar. 8, 1978

[51] Int. Cl.[2] .................................... H02H 3/28
[52] U.S. Cl. ............................ 361/45; 361/115
[58] Field of Search ............... 361/46, 44, 45, 115

[56] References Cited

U.S. PATENT DOCUMENTS

| | | | |
|---|---|---|---|
| 3,700,967 | 10/1972 | Hoss | 361/46 |
| 3,733,517 | 5/1973 | Wilson | 361/44 |
| 3,787,708 | 1/1974 | Hobson, Jr. | 361/44 |
| 3,908,154 | 9/1975 | Gryctko | 361/45 |
| 3,953,766 | 4/1976 | Howell et al. | 361/45 |
| 3,999,103 | 12/1976 | Misencik et al. | 361/45 |
| 4,044,395 | 8/1977 | Eckart | 361/44 |
| 4,051,544 | 9/1977 | Vibert | 361/45 |

*Primary Examiner*—Patrick R. Salce
*Attorney, Agent, or Firm*—Robert A. Cahill; Walter C. Bernkopf; Philip L. Schlamp

[57] ABSTRACT

A ground fault protector includes a conventional ground fault circuit interrupter (GFCI) electronic module which receives operating power over a separate supply circuit to render the protector operable in affording personnel ground fault protection for a circuit whose nominal voltage is inappropriate to power the module. The protector includes contacts operating in both the supply and protected circuits such that, in the event of a ground fault on the protected circuit, both circuits are interrupted. The supply circuit is also equipped to simulate a ground fault condition for verifying operability of the protector.

2 Claims, 2 Drawing Figures

DUAL VOLTAGE GROUND FAULT PROTECTOR

BACKGROUND OF THE INVENTION

Conventional ground fault circuit interrupting (GFCI) devices are currently being mass produced in circuit breaker and receptacle configurations for utilization in residential type circuits to protect personnel against the hazards of electrical shock due to ground faults. These GFCI devices include a differential current transformer having separate primary windings connected in the line and neutral sides of the circuit to be afforded ground fault protection. Any imbalance in the currents flowing in the line and neutral sides, as occasioned by current flowing through a line-to-ground fault and returning to the source through an extraneous ground circuit path, produces a signal in the differential current transformer secondary winding proportional to the current imbalance. Since for effective human shock protection, the GFCI device must respond to a 5 milliamp current imbalance, the transformer secondary signal must be processed by a module containing rather sophisticated and highly sensitive electronic circuitry pursuant to initiating a ground fault trip function leading to interruption of the circuit. Specifically, to effect a circuit interruption, the module acts to trigger an electronic switch, e.g., thyristor, thereby completing an energization circuit for a trip solenoid which acts to trip the GFCI device, causing its contacts, wired in the protected circuit, to spring open.

For the sake of convenience and efficiency of design, the active elements of the conventional GFCI device, i.e., trip solenoid and electronic module components, receive electrical power from the protected circuit downstream from the device circuit interrupting contacts. Since the typical residential-type circuit operates at 120 VAC, conventional GFCI modules are thus designed to operate at this voltage.

On occasion it would be desirable to afford personnel ground fault protection for special circuits operating at voltages other than 120 VAC. Unfortunately, since conventional GFCI devices are designed to operate properly only at 120 VAC, ground fault protection is not readily available for these special circuits.

It is accordingly a principal object of the present invention to provide a ground fault protector capable of affording personnel ground fault protection for special circuits operating at voltages other than the voltage conventional GFCI device electronic module circuitry is normally designed to accommodate.

A further object is to provide a ground protector of the above character, which is capable of utilizing conventional GFCI components.

Another object is to provide a ground fault circuit interrupting device of the above character which is efficient in design, inexpensive to manufacture and reliable in operation.

Other objects of the invention will in part be obvious and in part appear hereinafter.

SUMMARY OF THE INVENTION

In accordance with the present invention, there is provided a ground fault protector capable of affording ground fault protection for circuits operating at voltages other than the voltage at which conventional, mass produced GFCI devices are designed to operate. More specifically, a conventional GFCI device is modified such that its electronic module and trip solenoid can be powered from a separate electrical supply circuit operating at a standard voltage for which these components are designed. The circuit operating at a voltage different from the standard and to which ground fault protection is to be afforded is wired through the conventional GFCI device with a different one of the GFCI differential current transformer primary windings serially included in each circuit side. Also serially included in at least one side of the protected circuit are circuit interrupting contacts. Any differential or imbalance in the currents flowing in the two sides of the protected circuit produces a proportional ground fault signal in the differential transformer secondary which is applied to a GFCI electronic module in conventional fashion. If the current imbalance exceeds a predetermined threshold, e.g. 5 milliamps for human shock protection, the module triggers a thyristor into conduction to draw activating current through a trip solenoid from the supply circuit. Activation of the trip solenoid effects unlatching of the GFCI device contact operating mechanism in conventional fashion, and the circuit interrupting contacts spring open to interrupt the protected circuit.

Preferably, the ground fault protector of the present invention further includes auxiliary circuit interrupting contacts operating in the supply circuit. These auxiliary contacts are operatively coupled with the GFCI device circuit interrupting contacts such that both sets of contacts open and close in concert. Thus when the GFCI device contact opens in response to a ground fault trip function to interrupt the protected circuit, the auxiliary contacts also open to interrupt the supply current. Thus, sustained trip solenoid activating current is not permitted, and the trip solenoid need be designed for only limited duty.

As an additional feature of the present invention, the supply circuit is adapted to facilitate periodic testing of the operability of the ground fault protector. To this end, the supply circuit is provided with a branch circuit path which is routed through the differential current transformer toroidal core to serve as an additional primary winding. Included in this branch circuit path is a normally open test switch and a calibrated resistor. Upon closure of this test switch, a current slightly in excess of the predetermined differential current trip threshold level flows through this branch circuit from the supply source to simulate a ground fault condition which, if the GFCI device is functioning properly, will precipitate a ground fault trip function.

The invention accordingly comprises the features of construction, combination of elements, and arrangement of parts which will be exemplified in the construction hereinafter set forth, and the scope of the invention will be indicated in the claims.

For a fuller understanding of the nature and objects of the present invention reference should be had to the following detailed description taken in conjunction with the accompanying drawing in which.

Like reference numerals refer to corresponding parts throughout the several views of the drawing.

DETAILED DESCRIPTION

Figure 1:
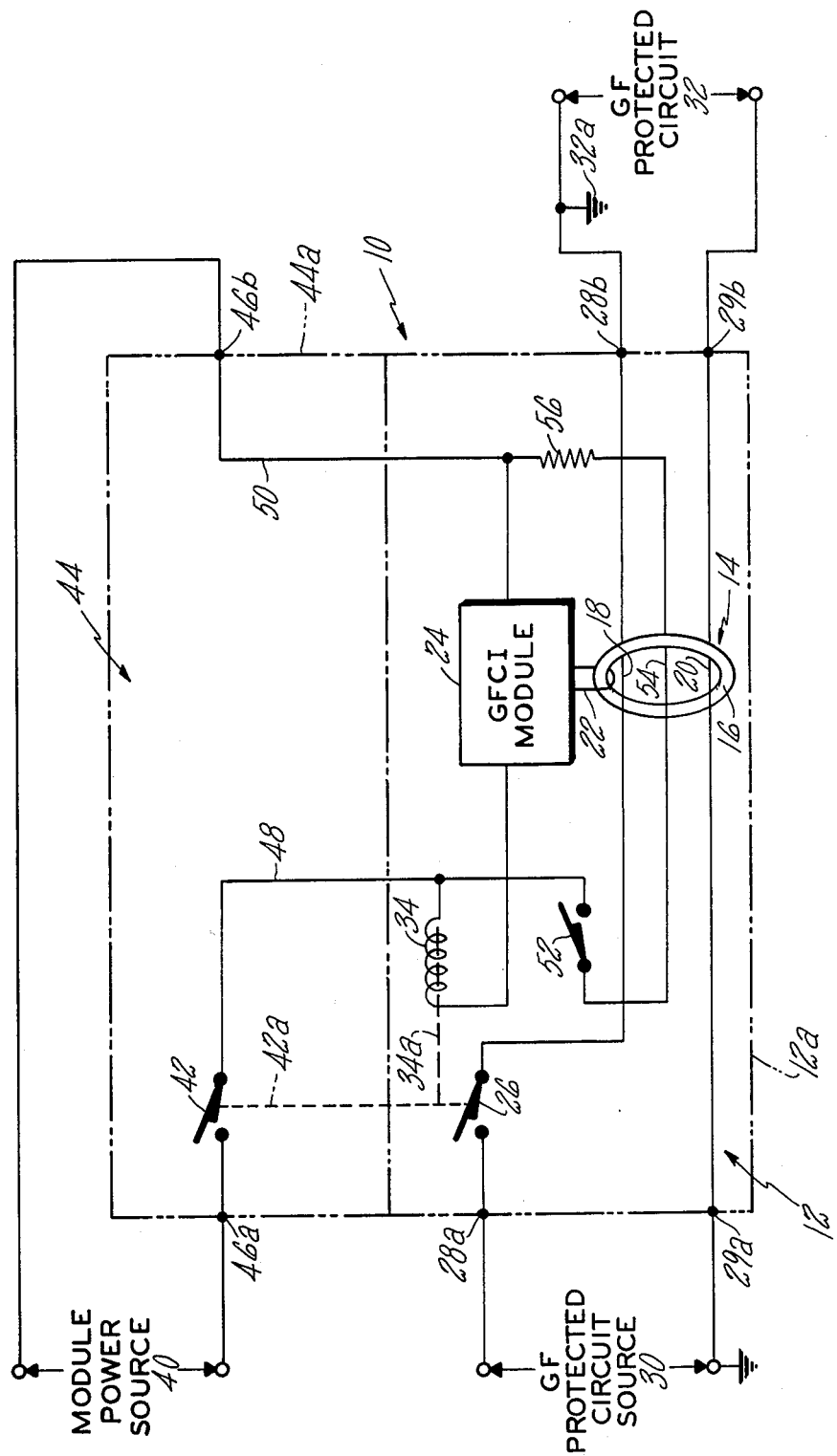
FIG. 1 is a schematic diagram of one embodiment of the present invention.

Referring to FIG. 1 of the drawing, the dual voltage ground fault protector of the present invention, generally indicated at 10, includes a ground fault circuit interrupting (GFCI) device, generally indicated at 12, which can be and preferably is a somewhat modified version of a commercially available GFCI device, such as mass produced by the Circuit Protective Devices Department of the General Electric Company in either a circuit breaker or a receptacle configuration. Detailed disclosures of such GFCI devices may be found in U.S. Pat. Nos. 3,950,677; 3,953,766 and 4,010,432. I have found however that the GFCI circuit breaker inherently is more conducive to implementation in the ground fault protector of the present invention. Thus, the GFCI circuit breaker 12, housed in a molded case illustrated in phantom at 12a, includes, as its basic operating components relevant to the present invention, a differential current transformer, generally indicated at 14 and including a toroidal core 16 adapted with single turn primary windings 18, 20 and a multi-turn secondary winding 22. The secondary winding supplies a ground fault signal to an electronic module 24 which is indicative of the magnitude of any imbalance in the currents flowing in primary windings 18 and 20, as is conventional.

One end of primary winding 18 is connected through breaker contacts 26 to a terminal 28a to which external electrical connection is made from the line side of a source 30. The other end of primary winding 18 is connected to a terminal 28b to which external electrical connection is made for the line side of a load circuit 32 to be afforded ground fault protection. Primary winding 20 is connected in series between terminals 29a and 29b of GFCI circuit breaker 12. Terminal 29a, typically in the form of a pigtail lead wire, is connected to the grounded neutral side of source 30, while terminal 29b is connected to the neutral side of load circuit 32.

From the description thus far, it is seen that should a ground fault 32a develop on the line side of load circuit 32, the resulting ground fault current would return as ground leakage current to the grounded neutral side of source 30 over an extraneous ground circuit path in shunt with differential current transformer primary winding 20. This situation causes an imbalance in the currents flowing in primary windings 18, 20, and a ground fault signal indicative of the magnitude of this primary current imbalance is developed in secondary winding 22 for application to ground fault module 24. If this primary current imbalance exceeds a predetermined threshold level established in the ground fault module, e.g. 5 milliamps for personnel shock protection or a high threshold level if only equipment ground fault protection is desired, a ground fault trip function is initiated to precipitate the opening of breaker contacts 26 to interrupt the flow of current in load circuit 32.

While not illustrated in the drawing, GFCI circuit breaker 12 would typically also include, in conventional fashion, provisions for initiating a ground fault trip function in response to the existence of a low impedance ground fault on the neutral side of load circuit 32, as well as provisions for affording overcurrent protection to the load circuit.

Normally, ground fault module 24 derives its operating power from the load circuit in which the GFCI circuit breaker 12 is installed at a point downstream from the breaker contacts 26. To initiate a ground fault trip function, module 24 includes a thyristor (not shown) which is triggered to draw activating current through a trip solenoid 34 whose plunger then acts mechanically, as indicated diagrammatically at 34a, to precipitate opening of the breaker contacts 26. Normally, activating current for the trip solenoid is also derived from the ground fault protected load circuit downstream from the breaker contacts. Since the typical load circuit in the United States for which personnel ground fault protection is sought is a 120 VAC circuit, the ground fault module and trip solenoid are specifically designed to be operated at this voltage. Consequently, if the source voltage for a particular load circuit has a nominal voltage rating significantly different from 120 VAC, e.g., less than 100 volts or greater than 140 volts, GFCI devices, as currently being mass produced, are not applicable to affording ground fault protection for such circuits.

In accordance with the present invention, ground fault protector 10 is constructed so as to derive ground fault module and trip solenoid operating power from a source separate and distinct from the source feeding the load circuit for which ground fault protection is sought. Thus, protector 10 is capable of affording ground fault protection to load circuit 32, regardless of the voltage rating of its source 30, consistent with the interrupting capacity and dielectric withstand of GFCI circuit breaker 12. To insure proper phasing, the module should be equipped with full-wave rectification.

To this end, a separate module power source 40, rated at a voltage consistent with the voltage at which trip solenoid 34 and ground fault module 24 are designed to operate, e.g. 120 VAC, is accommodated to power these components. Preferably, the power circuit connecting source 40 with trip solenoid 34 and ground fault module 24 includes auxiliary switch contacts 42 which are mechanically coupled with breaker contacts 26, as indicated diagrammatically at 42a, such that these two sets of contacts open and close in concert. Thus, when the breaker contacts 26 are closed to conduct current to load circuit 32, auxiliary contacts 42 close to power up the ground fault module 24. By the same token, when activating current is drawn through trip solenoid 34 pursuant to initiating a ground fault trip function, the two sets of contacts open in concert to interrupt the flow of load current as well as trip solenoid activating current. Consequently, the trip solenoid need not be designed to withstand the flow of activating current therethrough for a prolonged period.

A particularly convenient way of implementing auxiliary switch contacts 42 to GFCI circuit breaker 12 is through the utilization of a conventional circuit breaker, generally indicated at 44, whose molded case 44a is ganged in side-by-side relation with molded case 12a GFCI circuit breaker 12 in typical two-pole breaker fashion. The diagrammatically illustrated mechanical coupling 42a between the two sets of contacts 26 and 42 would be constituted by an external handle tie and an internal common trip bar. Alternatively, the requisite module power circuit switching function could be provided by the combination circuit breaker-auxiliary switch construction disclosed in commonly assigned U.S. Pat. No. 3,973,230.

In either case, the illustrated lower side of module power source 40 is connected to terminal 46a of auxiliary switch case 44a and thence via auxiliary switch contacts 42 and internal lead 48 to one end of trip solenoid 34. The other end of the trip solenoid coil is connected to one power input terminal of ground fault module 24. The other module power input terminal is connected via lead 50 to auxiliary switch case terminal 46b were external circuit connection is made to the other side of module power source 40. It is thus seen that with contacts 26 and 42 closed, the ground fault module 24 derives its operating power from source 40 through trip solenoid coil 34. The current drawn through the trip solenoid coil to power the ground fault module is well below the level necessary to activate the trip solenoid. However, when a ground fault trip function is to be initiated, the triggering of the thyristor within the module completes a low impedance circuit path such that the current drawn through the trip solenoid is abruptly increased to a level sufficient to achieve solenoid actuation and consequent opening of the contacts 26 and 42.

Conventional ground fault circuit interrupting devices are required to include provisions for periodically testing its repsonse to a simulated ground fault condition. This is accomplished by by-passing current slightly in excess of the established trip threshold level around one of the differential current transformer primary windings. To this end, a circuit path including a normally open test switch and a calibrated resistor is connected from the load side of one primary winding to the line side of the other primary winding. The resistance value of the resistor is selected such that for a conventional load circuit voltage, current of a level slightly in excess of the established trip threshold level is by-passed around one of the differential current transformer primary windings, thereby creating the requisite primary current imbalance to which the ground fault module should respond pursuant to initiating a ground fault trip function. It is thus seen that the load circuit source voltage must be known prior to the selection of the value of this resistor, if a reliable test procedure is to be provided.

In accordance with the present invention, provision for testing the operability of ground fault protector 10 are provided, regardless of the rated voltage of source 30. To this end, the module power circuit is provided with a branch circuit path connected between internal leads 48 and 50 in shunt with trip solenoid 34 and ground fault module 24. Included in this branch circuit path is a normally open test switch 52, a third primary winding 54 for differential current transformer, and a resistor 56 whose resistance is selected on the basis of the known voltage rating of source 40. Thus upon closure of switch 52, current of a level slightly in excess of the trip threshold level is drawn through primary winding 54. This current flowing through primary winding 54 is seen by ground fault module 24 as a primary current imbalance exceeding the established threshold level. The consequent tripping of the GFCI circuit breaker 12 verifies the operability of protector 10 in responding to a true ground fault condition on load circuit 32, such as indicated at 32a.

Figure 2:
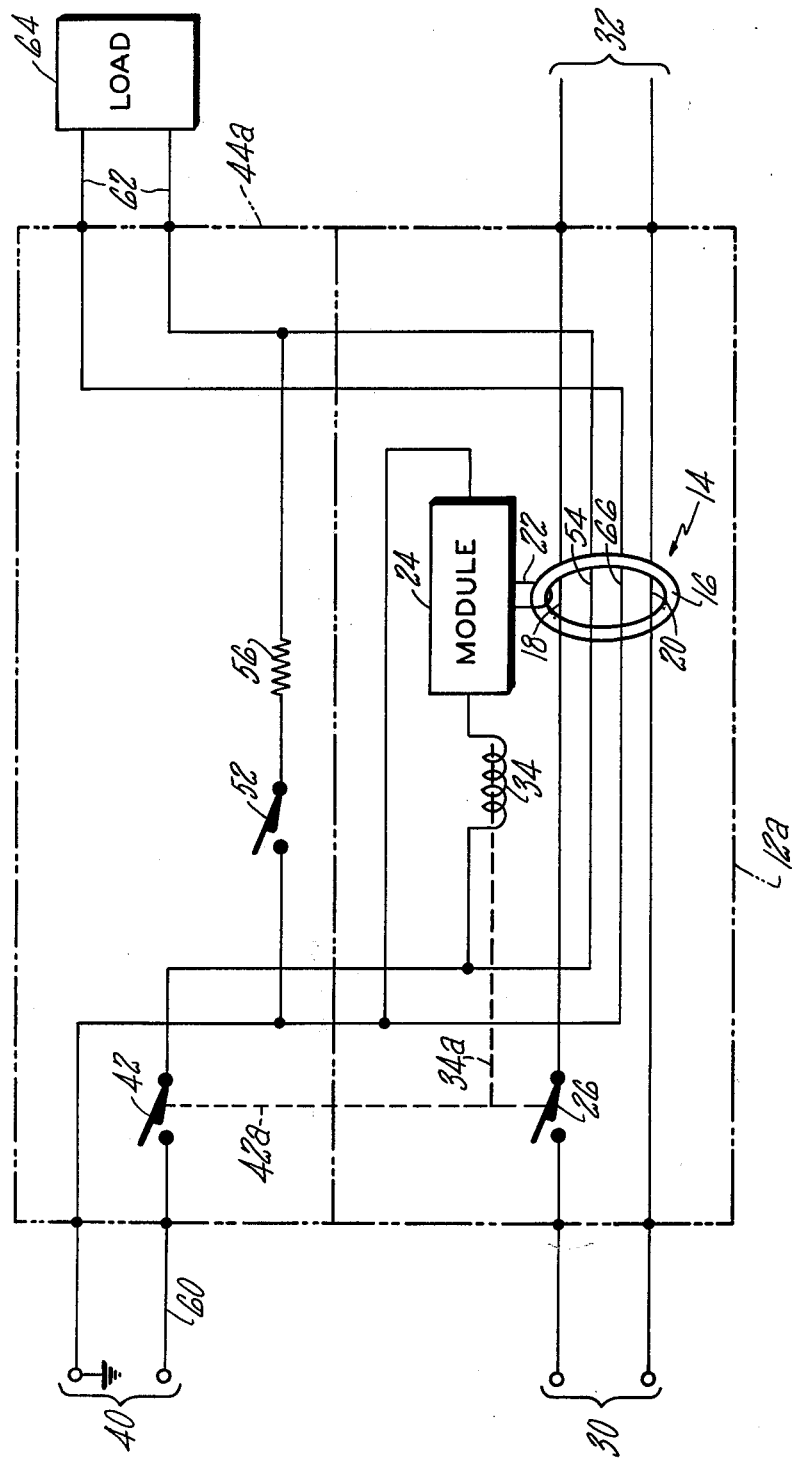
FIG. 2 is a schematic diagram of an alternative embodiment of the invention.

In many applications of the ground fault protector of FIG. 1, it may be desirable to power conventional, external load from the module power source 40 and to also afford ground fault protection for this conventional load circuit. FIG. 2 illustrates a modification of ground fault protector 10 of FIG. 1 designed to accommodate this situation. Thus, as seen in FIG. 2, the line side of module power source 40, indicated at 60, is routed through auxiliary contacts 42 and third differential current transformer primary winding 54 to the line side of a load circuit 62 feeding a conventional 120 VAC load 64. The neutral side 62 of module power source 40 is routed through a fourth primary winding 66 for differential current transformer 14 to load circuit 62 and load 64. The series combination of trip solenoid 34 and GFCI module 24 is connected across the line and neutral sides of source 40 so as to be powered therefrom as in the embodiment of FIG. 1.

By virtue of the ground fault protector construction seen in FIG. 2, it will be apparent that a ground fault trip function will be initiated in response to a ground fault on either of the load circuits 32 and 62. That is, a ground fault on load circuit 32 will create a current imbalance in differential current transformer primary windings 18 and 20 as in the embodiment of FIG. 1, while a ground fault on load circuit 62 will create a current imbalance in primary windings 54 and 66. In either case, a ground fault trip function precipitating the opening of contacts 26, 42 will be initiated if either current imbalance exceeds the threshold established in GFCI module 24.

To test the operability of the ground fault protector of FIG. 2, test switch 52 and resistor 56 are connected from the line side of the module power circuit at a location on the load side of primary winding 54 to the neutral side of the module power circuit on the line side of primary winding 66. It is seen that closure of test switch 52 draws a current of threshold exceeding magnitude through resistor 56 which shunts primary winding 66, thus creating the requisite current imbalance in primary windings 54, 66 to which the ground fault protector should respond.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A ground fault protector for affording ground fault protection to a load circuit powered from an AC source of nonstandard voltage, said protector comprising, in combination:
   A. a molded case ground fault interrupting circuit breaker including
      (1) breaker contacts,
      (2) a differential current transformer having first, second and third primary windings and a secondary winding,
      (3) an electronic ground fault module connected with said secondary winding for processing a ground fault signal induced therein pursuant to initiating a ground fault trip function,
      (4) a trip solenoid activated under the control of said module to precipitate opening of said breaker contacts, thereby effectuating said ground fault trip function;
      (5) line and neutral terminals for respective connection to the line and neutral sides of the non-standard voltage source, load power and load neutral terminals for respective connection to the line and neutral sides of the ground fault protected load circuit, said line and load power terminals connected in series through said breaker contacts and said first primary winding, and said neutral and load neutral terminals connected in series through said second secondary winding, and (6) a normally open test switch and a calibrated resistor electrically connected in series with said third primary winding; and B. a conventional molded case circuit breaker ganged in side-by-side relation with said ground fault circuit breaker and including
  (1) line and load terminals for connection across a standard voltage source,
  (2) breaker contacts operatively coupled with said breaker contacts of said ground fault circuit breaker such as to be opened and closed in concert therewith, and
  (3) said module, trip solenoid, and the series combination of said test switch, resistor and third secondary winding connected between said line and load terminals of said conventional circuit breaker to draw current from the standard voltage source through said breaker contacts of said conventional circuit breaker.

2. A ground fault protector for affording ground fault protection to a first load circuit powered from a first AC source of non-standard voltage and a second load circuit powered from a second AC source of standard voltage, said protector comprising, in combination:

A. a molded case ground fault interrupting circuit breaker including
  (1) first breaker contacts,
  (2) a differential current transformer having first, second, third and fourth primary windings and a secondary winding,
  (3) an electronic ground fault module connected with said secondary winding for processing a ground fault signal induced therein pursuant to initiating a ground fault trip function,
  (4) a trip solenoid activated under the control of said module to precipitate opening of said first breaker contacts, thereby effectuating said ground fault trip function,
  (5) first line and neutral terminals for respective connection to the line and neutral sides of said first voltage source, first load power and load neutral terminals for respective connection to the line and neutral sides of the ground fault protected first load circuit, said first line terminal and said first load power terminal connected in series through said first breaker contacts and said first primary winding, and said first neutral terminal and said first load neutrl terminal connected in series through said second primary winding; and B. a second molded case circuit breaker ganged in side-by-side relation with said first circuit breaker and including
  (1) second line and neutral terminals for respective connection to the line and neutral sides of the second voltage source, and second load power and load neutral terminals for respective connection to the line and neutral sides of the ground fault protected second load circuit,
  (2) second breaker contacts operatively coupled with said first breaker contacts such as to be opened and closed in concert therewith, said second breaker contacts connected in series with said third primary winding between said second line and load power terminals,
  (3) said second neutral and load neutral terminals connected in series through said fourth primary winding,
  (4) said module and trip solenoid connected with said second line and neutral terminals such as to receive operating power from the second source through said second breaker contacts, and
  (5) the series combination of a normally open test switch and a calibrated resistor connected between said second line and neutral terminals and effective upon closure of said test switch to shunt current from one of said third and fourth primary windings.

* * * * *